United States Patent
Ta et al.

(10) Patent No.: US 10,183,698 B2
(45) Date of Patent: Jan. 22, 2019

(54) FUEL TO ELECTRIC REUSABLE CONVERSION KIT AND A METHOD OF CONVERTING AND REUSING THE CONVERSION KIT

(71) Applicant: Services Automobiles GranTuned Inc., Montreal (CA)

(72) Inventors: Duy-An Ta, Montreal (CA); Noël Giguère, Montreal (CA); François-Nicolas Lanciault, Napierville (CA)

(73) Assignee: Services Automobiles GranTuned Inc., Varenne, QC (CA)

( * ) Notice: Subject to any disclaimer, the term of this patent is extended or adjusted under 35 U.S.C. 154(b) by 0 days.

(21) Appl. No.: 15/541,481

(22) PCT Filed: Mar. 29, 2016

(86) PCT No.: PCT/CA2016/050364
§ 371 (c)(1),
(2) Date: Jul. 4, 2017

(87) PCT Pub. No.: WO2016/149836
PCT Pub. Date: Sep. 29, 2016

(65) Prior Publication Data
US 2018/0022387 A1    Jan. 25, 2018

Related U.S. Application Data

(60) Provisional application No. 62/138,726, filed on Mar. 26, 2015.

(51) Int. Cl.
*B60K 1/00* (2006.01)
*B62D 21/11* (2006.01)
(Continued)

(52) U.S. Cl.
CPC ............... *B62D 21/11* (2013.01); *B60K 1/00* (2013.01); *B60K 1/04* (2013.01); *B60K 5/10* (2013.01);
(Continued)

(58) Field of Classification Search
CPC .......... B60K 1/00; B60K 1/04; B60K 5/1275; B60K 2001/0411; B60K 2001/0438;
(Continued)

(56) References Cited

U.S. PATENT DOCUMENTS

| 3,514,681 A | * | 5/1970 | Dorn Walter | ............ | B60K 1/02 |
| | | | | | 180/65.1 |
| 3,708,028 A | * | 1/1973 | Hafer | ...................... | B60K 1/04 |
| | | | | | 104/34 |

(Continued)

FOREIGN PATENT DOCUMENTS

| DE | 2455790 A1 | * | 6/1976 | ........... B60K 5/1275 |
| FR | 2975067 A1 | * | 11/2012 | ............... B60K 1/00 |
| FR | 2979093 A1 | * | 2/2013 | ............... B60K 1/00 |

OTHER PUBLICATIONS

Herman K. Trabish, "Motiv Power's Electric Drive Kit Could Electrify US Truck Fleet", Internet article, GreenTechMedia.com; dated Feb. 28, 2012, https://www.greentechmedia.com/articles/read/motiv-powers-electric-drive-kit-could-electrify-u-s-truck-fleet#gs.666VHJM.*

(Continued)

*Primary Examiner* — James A Shriver, II
*Assistant Examiner* — Steve Clemmons
(74) *Attorney, Agent, or Firm* — Anglehart et al.

(57) ABSTRACT

Suitable for frame vehicles, the kit provides a frame to be mounted on the chassis with attachment devices at a head section and at a middle section of the frame that supports an electric motor, a transmission and at least one battery (Continued)

system. Replacement of the conventional engine and transmission by the frame-mounted unit can be fast. The frame can be attached at the middle section using shear bolts to avoid impeding a crumple of the chassis during a front impact.

16 Claims, 10 Drawing Sheets

(51) Int. Cl.
*B60K 1/04* (2006.01)
*B62D 21/02* (2006.01)
*B60K 5/10* (2006.01)
*B60K 5/12* (2006.01)
*B60K 17/06* (2006.01)
*B60L 11/18* (2006.01)
*B62D 21/12* (2006.01)
*B62D 21/15* (2006.01)
*B62D 27/06* (2006.01)
*B62D 65/10* (2006.01)

(52) U.S. Cl.
CPC ............ *B60K 5/1275* (2013.01); *B60K 17/06* (2013.01); *B60L 11/1877* (2013.01); *B62D 21/02* (2013.01); *B62D 21/12* (2013.01); *B62D 21/155* (2013.01); *B62D 27/06* (2013.01); *B62D 65/10* (2013.01); *B60K 2001/0411* (2013.01); *B60K 2001/0438* (2013.01); *B60Y 2200/141* (2013.01); *B60Y 2200/91* (2013.01); *B60Y 2304/076* (2013.01); *B60Y 2304/078* (2013.01)

(58) Field of Classification Search
CPC ............ B60L 11/1877; B60L 125/20; B60L 125/2009; B60L 2200/36; B60L 2240/423; B60L 2240/64; B62D 21/155; B62D 27/06; B62D 65/10; B60Y 2304/076; B60Y 2304/078
See application file for complete search history.

(56) References Cited

U.S. PATENT DOCUMENTS

| | | | | |
|---|---|---|---|---|
| 3,861,485 A | | 1/1975 | Busch | |
| 3,902,565 A | * | 9/1975 | Farrall | B60K 1/00 180/65.1 |
| 3,983,429 A | * | 9/1976 | Allardice, Jr. | H02K 5/26 310/91 |
| 4,823,923 A | * | 4/1989 | Moyer | B60R 19/34 188/375 |
| 6,494,286 B2 | * | 12/2002 | Shimizu | B60K 1/00 180/299 |
| 6,547,020 B2 | * | 4/2003 | Maus | B60K 1/04 180/68.5 |
| 6,668,957 B2 | * | 12/2003 | King | B60R 16/04 180/68.5 |
| 7,588,117 B2 | * | 9/2009 | Fukuda | B60K 1/00 180/291 |
| 7,874,395 B2 | | 1/2011 | Taji et al. | |
| 8,372,530 B2 | * | 2/2013 | Kubota | B60K 1/04 180/65.1 |
| 8,387,728 B1 | * | 3/2013 | Larke | B60K 1/00 180/65.1 |
| 8,479,868 B2 | | 7/2013 | Wakatsuki et al. | |
| 8,511,416 B2 | * | 8/2013 | Hiruma | B60K 1/00 180/291 |
| 8,960,357 B2 | * | 2/2015 | Maurer | B60K 1/04 180/291 |
| 8,991,535 B2 | * | 3/2015 | Grishashvili | B60K 1/04 180/68.5 |
| 9,050,897 B1 | * | 6/2015 | Collins | B60L 11/12 |
| 9,056,557 B2 | | 6/2015 | Kedzierski | |
| 9,102,221 B1 | * | 8/2015 | Monfort | B60K 1/00 |
| 9,561,713 B2 | * | 2/2017 | Netherland | F16M 1/00 |
| 2004/0046296 A1 | | 3/2004 | Miyahara | |
| 2010/0025131 A1 | * | 2/2010 | Gloceri | B60G 3/20 180/65.28 |
| 2012/0145467 A1 | | 6/2012 | Wakatsuki et al. | |
| 2013/0091694 A1 | * | 4/2013 | Hussain | B60W 20/00 29/593 |
| 2013/0112490 A1 | | 5/2013 | Grishashvili et al. | |
| 2013/0119704 A1 | * | 5/2013 | Amano | B60K 1/00 296/187.1 |
| 2013/0139626 A1 | | 6/2013 | Agnew | |
| 2013/0192914 A1 | * | 8/2013 | Nakamori | B60K 1/04 180/68.5 |
| 2014/0262567 A1 | | 9/2014 | Kedzierski | |
| 2015/0280188 A1 | * | 10/2015 | Nozaki | B60K 1/04 429/156 |
| 2017/0361697 A1 | * | 12/2017 | Haupt | B60K 6/405 |

OTHER PUBLICATIONS

Srianthi Perera, "Surprise resident designs vehicle conversion technology", The Republic, Published Feb. 13, 2015, https://www.azcentral.com/story/news/local/surprise/2015/02/13/surprise-resident-designs-vehicle-conversion-technology/23379207/.*
PCT/CA2016/050364 International search report.
PCT/CA2016/050364 IPRP.
PCT/CA2016/050364 Written Opinion.

* cited by examiner

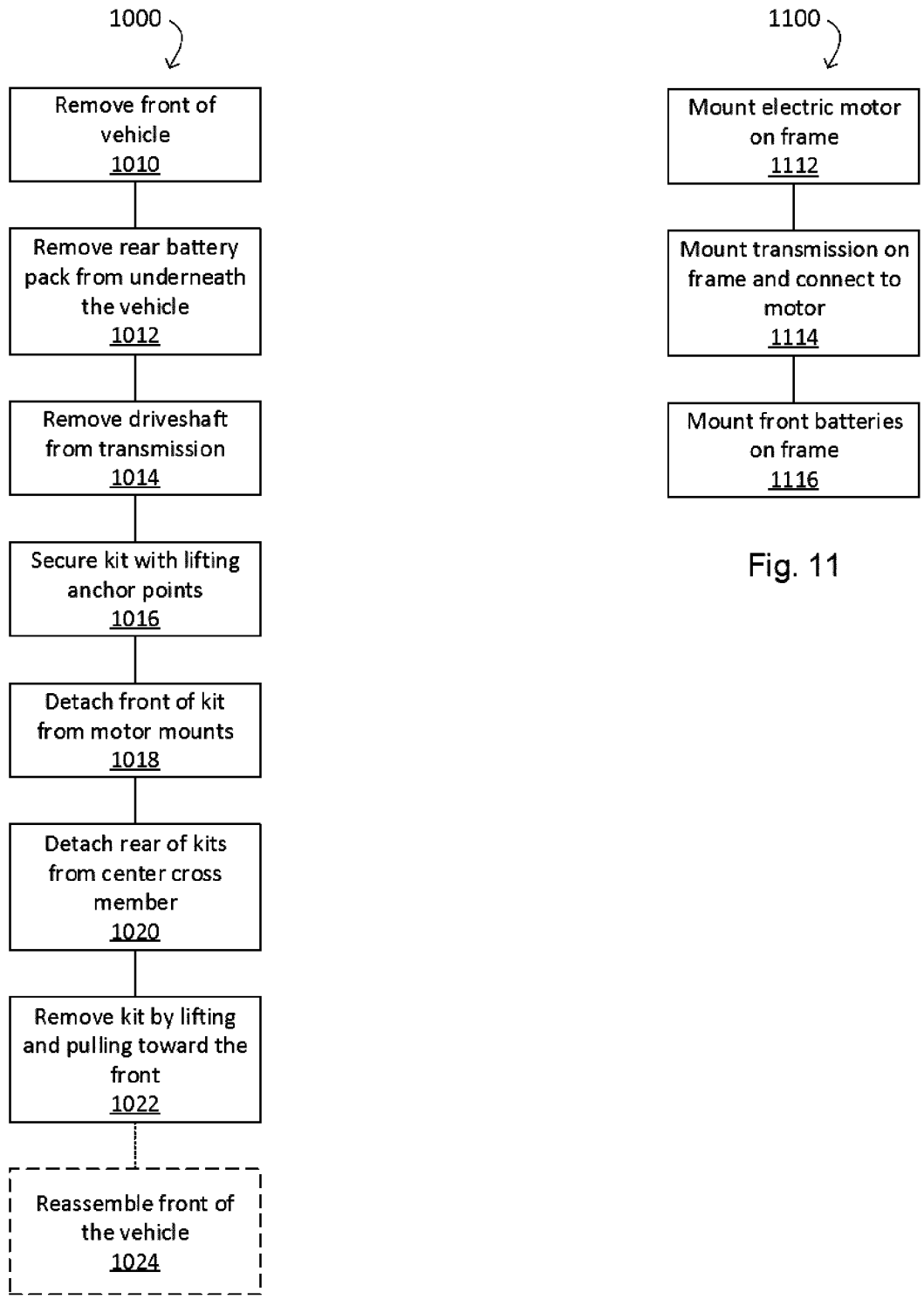

FUEL TO ELECTRIC REUSABLE CONVERSION KIT AND A METHOD OF CONVERTING AND REUSING THE CONVERSION KIT

FIELD OF THE INVENTION

The subject matter disclosed generally relates to a reusable kit for converting a combustion vehicle to an electric vehicle. More particularly, the subject matter disclosed relates to a reusable kit for converting a combustion vehicle, having an H-Frame chassis, to an electric vehicle.

BACKGROUND

Over the last decades, interest in vehicle electrification has been on the rise since electric vehicles are known to be less air polluting than traditional combustion engine vehicles and help in reducing greenhouse gas emissions. While several manufacturers have started to develop new hybrid vehicles and battery powered vehicles most vehicles on our roads are still combustion engine vehicles. It is even more the case for truck vehicles that are generally bigger vehicles requiring more power than simple passenger vehicles. Large fleets of truck vehicles, often owned by companies, municipalities/cities and various other government organizations, are on the road for extensive amounts of hours and rapidly reach a high mileage. It is known that accumulated mileage on a vehicle is an indicator of the wear sustained by the combustion engine. Vehicles being used extensively during a relatively short period of time present a powertrain and more specifically a combustion engine having a short life in comparison with the vehicle body. This results in having to prematurely, replace the truck vehicle by a new truck vehicle after only a few years of use and incurring extensive costs. Some have attempted to replace the powertrain of those vehicles with electric powertrains since electric motors are known to last longer in addition to being less air polluting. In fact electric motors are known to outlast the body life of the truck. For this reason, many have developed solutions to convert a combustion vehicle, such as a truck, into an electric vehicle.

U.S. Pat. No. 5,562,178 to Worden et al. discloses a rear drive electric vehicle and presents a vehicle layout in which an electric motor is located at the rear of the vehicle's rear axle. The vehicle has an electric motor that is connected to a drive shaft that drives the vehicle's rear axle through a rearwards facing differential. This arrangement leaves the entire underside of the vehicle from the front axle to the rear axle available to accommodate batteries or other large bulky devices.

U.S. Pat. No. 9,050,897 to Collins discloses a kit for replacing an internal combustion engine of a truck vehicle with an electric motor, batteries and electric generator. As much of the existing vehicle as possible is left unmodified so that the inclusion of the kit with the existing vehicle can be as simple as possible. However since different vehicles have a volume and geometry of space available after the internal combustion engine has been removed and have a variety of different orientations of drive shaft, the kit must be configured differently for each vehicle with which it is intended to be used, to simplify the installment of the kit.

Even though many have attempted in simplifying the replacement of an original powertrain by an electric powertrain, the above mentioned references do not disclose a way to convert a combustion engine vehicle into an electric vehicle that still follows the various safety regulations as is the case for the combustion engine vehicle originally released by the manufacturer. Therefore there is a need for a kit and method of converting a combustion engine vehicle to an electric vehicle that follows the same safety regulations while still remaining simple to convert. Moreover, the above mentioned references do not disclose a conversion kit that is reusable.

SUMMARY

The present embodiments describe a reusable kit for replacing the engine of a vehicle, such as a pick-up truck type vehicle that uses an H-frame chassis.

Various embodiments offer various advantages, including faster installation of the electric motor system, ease of integration with the original vehicle's systems including, but not limited to, air conditioning, power steering, power braking, anti-lock braking/skid control, heating and other accessories, and avoiding impedance of chassis crumple during a front impact.

Inventive features of the conversion kit, truck-type vehicle, frame and method of converting a vehicle to an electric vehicle as defined in the appended claims.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which:

FIG. 10 presents a method of removing a kit from a vehicle for reusing the kit in another vehicle, according to one embodiment;

FIG. 11 presents a method of assembling a kit, according to one embodiment;

It will be noted that throughout the appended drawings, like features are identified by like reference numerals.

DETAILED DESCRIPTION

The embodiments describe a conversion kit for converting combustion vehicles into electric vehicles, a method of converting combustions vehicles into electric vehicles and also.

Suitable for frame vehicles, the kit provides a frame to be mounted on the chassis with attachment devices at a head section and at a middle section of the frame that supports an electric motor, a transmission and at least one battery system. Replacement of the conventional engine and transmission by the frame-mounted unit can be fast. In this way, said frame and/or said attachment devices allow for said chassis to crumple during a front impact without offering any significant additional resistance. The frame can be attached at the middle section using shear bolts to avoid impeding a crumple of the chassis during a front impact.

Figure 1:
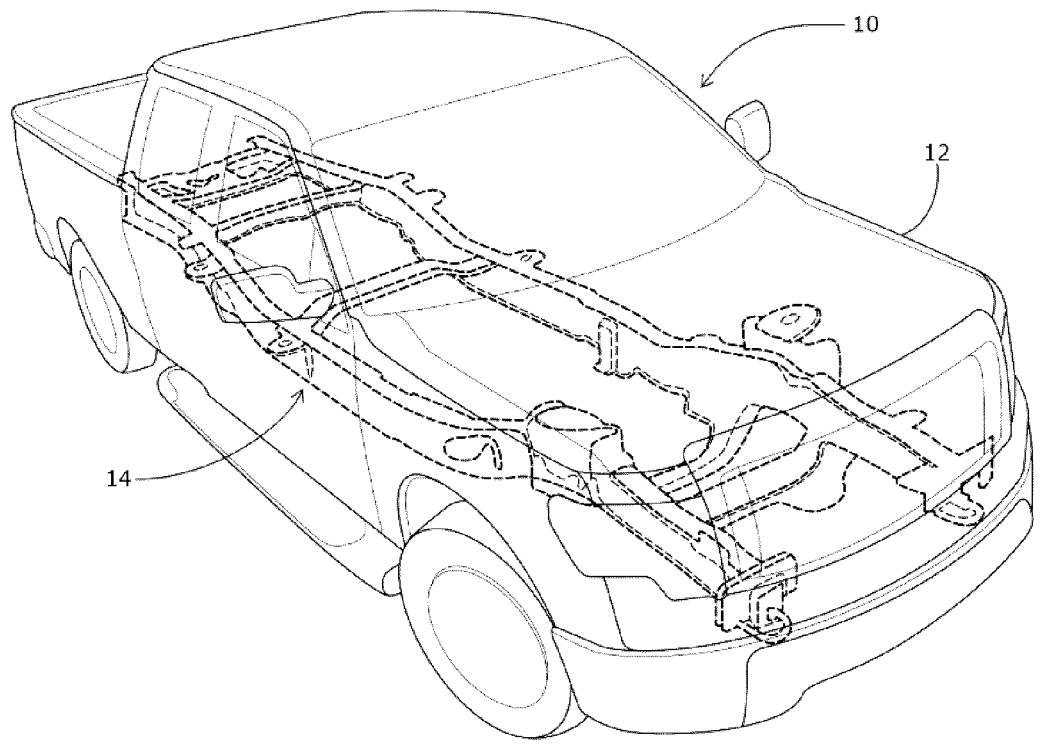
FIG. 1 presents a perspective view of a truck vehicle having an H-frame chassis in phantom lines according to the prior art.
Figure 2:
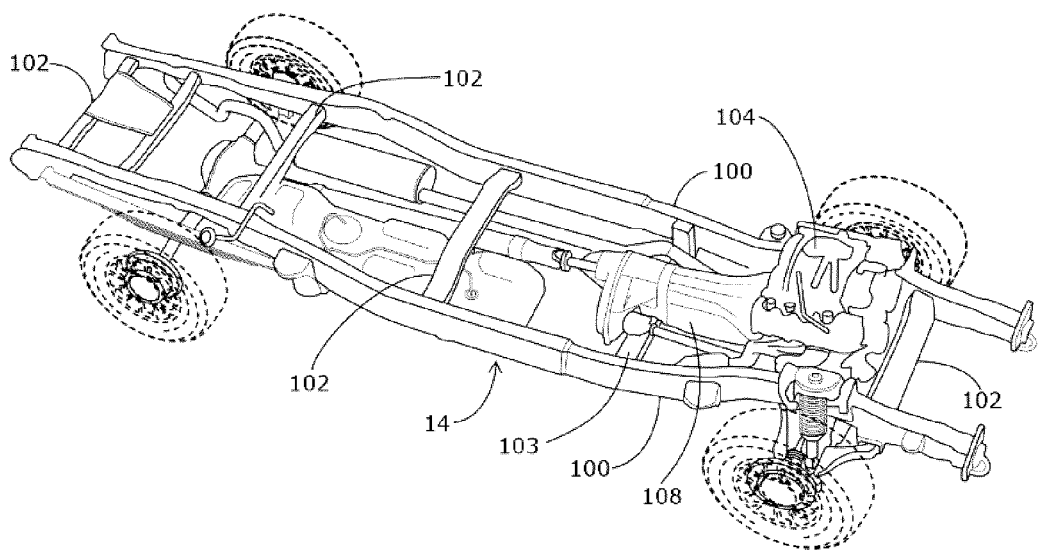
FIG. 2 presents a top perspective view of the chassis of FIG. 1 illustrated with the vehicle powertrain and running gear components mounted thereto according to the prior art.

The present invention will be more readily understood by referring to the following examples which are given to illustrate the invention rather than to limit its scope. The examples are provided with respect to a given type of vehicles namely pick-up trucks. However, the embodiments can be applied to any type of vehicle such as a Ford Econoline™, a pick-up truck, a bus, a specialize transport vehicle such as a mail delivery truck, a food truck, a handicap transportation vehicle and or any other type of vehicle having an H-frame chassis structure or that is not a unibody frame vehicle With reference to FIG. 1, there is presented a perspective view of a chassis 14 positioned in a truck vehicle 10. The chassis 14 is the underpart of the vehicle 10 and consists of an internal framework for supporting a body 12 of the vehicle 10. In the case of a conventional truck vehicle 10, a running gear is attached to the chassis 14. As illustrated in FIG. 2, running gear elements such as a combustion engine, a transmission, a wheel axle, an exhaust and a fuel tank are attached to the chassis 14. Alone, the chassis 14 includes two beam-like supports 100 that are parallel to each other and linked by a plurality of cross members 102 and 103 adapted to support the running gear elements. More particularly, cross member 103 is adapted to support at least in part an original transmission 108.

Every vehicle design that is allowed to circulate on public roads must first be approved by various regulatory bodies. That is, every part of a vehicle is carefully designed and configured in order to satisfy, among others, the safety requirements provided by the regulatory bodies. The chassis 14 being a central structural element of the vehicle 10, undergoes strict safety measures before being approved. Since each type of chassis 14 commercially sold in truck vehicles 10 has undergone rigorous approval processes, it is desirable to limit, if any, the amount of structural modifications to the chassis 14, when mounting an electric conversion kit on the chassis 14.

Figure 3:
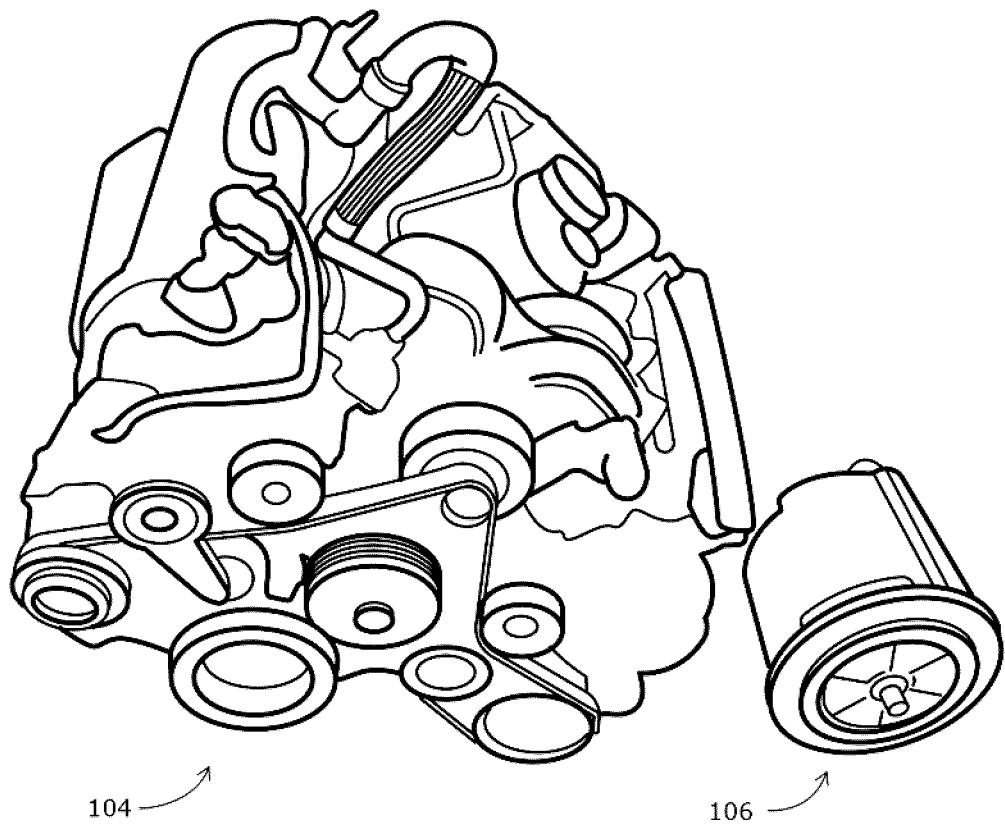
FIG. 3 presents an original combustion engine of the vehicle next to an electric motor, according to one embodiment.
Figure 4:
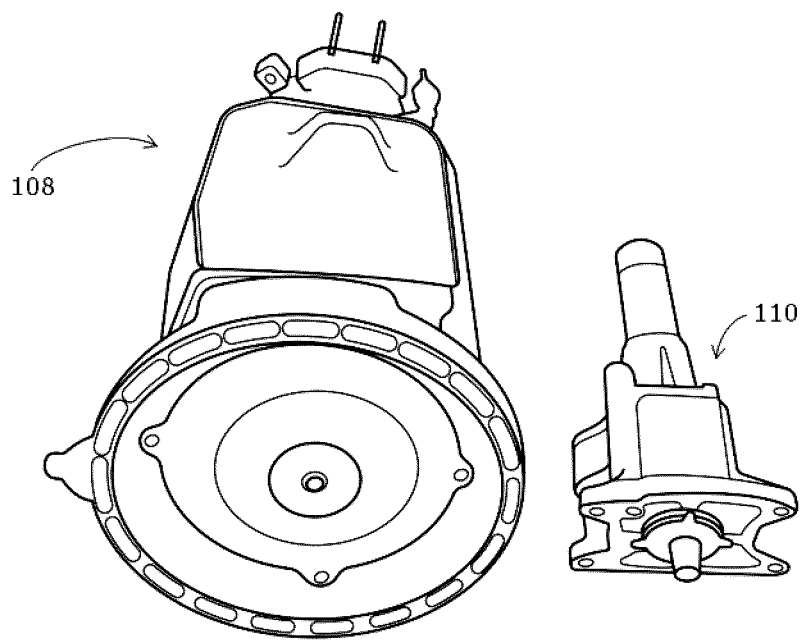
FIG. 4 presents an original transmission of the vehicle next to a replacement transmission adapted to the electric motor of FIG. 3, according to one embodiment.

Consequently, various embodiments of the invention replace the original combustion motor or engine of the vehicle by an electric motor and replace the original transmission that is associated with the original engine by an adapted transmission without modifying the chassis 14. With reference to FIGS. 3 and 4, the embodiments replace the engine 104 with the electrical motor 106, and replace the original transmission 108 with an adapted transmission 110. As can be noticed, the electric motor 106 and adapted transmission 110 are of a smaller dimension than that of the original engine 104 and original transmission 108 of the vehicle 10 as commercially sold. A replacement of those elements attached to the existing chassis 14 can be challenging.

Figure 5A:
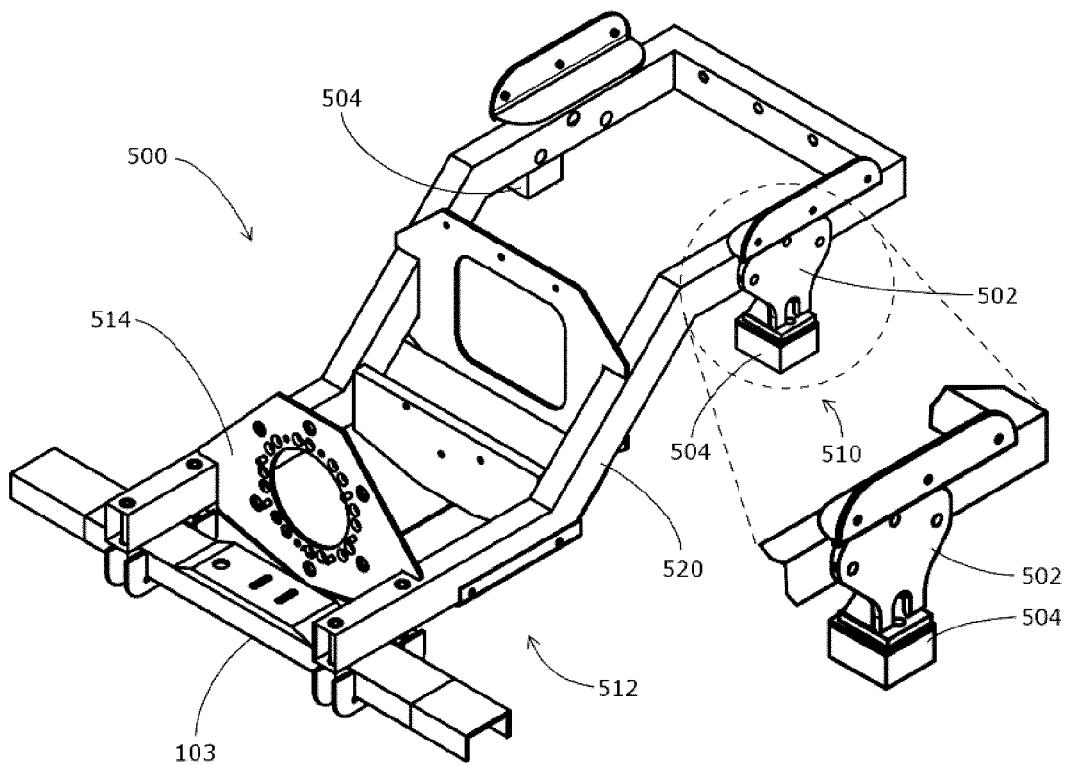
FIG. 5*a* presents an electric vehicle conversion kit component having a frame to which can be mounted the electric motor and the replacement transmission of FIGS. 3 and 4 and having mounting systems adapted to attach to the chassis of FIG. 1, according to one embodiment.

As further presented in FIG. 5a, the frame 520 has a frontal portion 510 and a rear portion 512. The frontal portion 510 is adapted to support at least one battery pack and the rear portion 512 is adapted to support the electric motor 106 as well as the adapted transmission 110 with plate 514. In this frame 520, the frontal portion 510 is operatively elevated with respect to the rear portion 512, in order to provide space for supporting at least one battery pack 602 from operatively above the frame 520 as well as at least one other battery pack 604 from operatively below the frame 520, as concurrently presented in FIG. 6b.

Figure 5B:
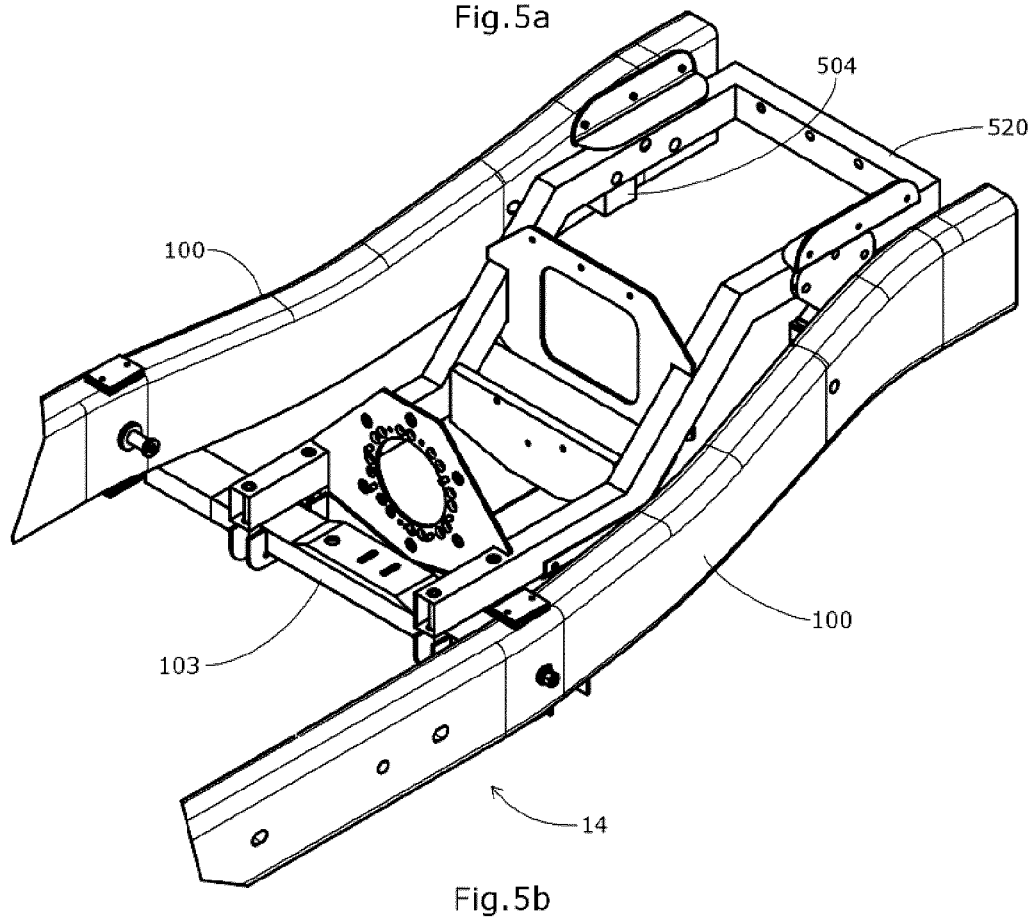
FIG. 5*b* presents the electric vehicle conversion kit of FIG. 5*a* mounted to the chassis of FIG. 1, according to one embodiment.

In the above mentioned embodiments of FIGS. 5a and 5b, the frame 520 is made from square steel tubing having a gage of ⅛ of an inch. However, a skilled person will understand that other types of material such as aluminum or stainless steel can be used and that other types of tubing (ex.: round tubular), folded metal (ex.: c-channel) or casting (ex.: H-beam) profiles are possible without departing from the scope of the present frame 520. For instance, the tubing used in the frame 520 of FIGS. 6a and 6b is a c-channel folded metal that is lighter than the square steel tubing of the frame 520 in FIGS. 5a and 5b.

Figure 6A:
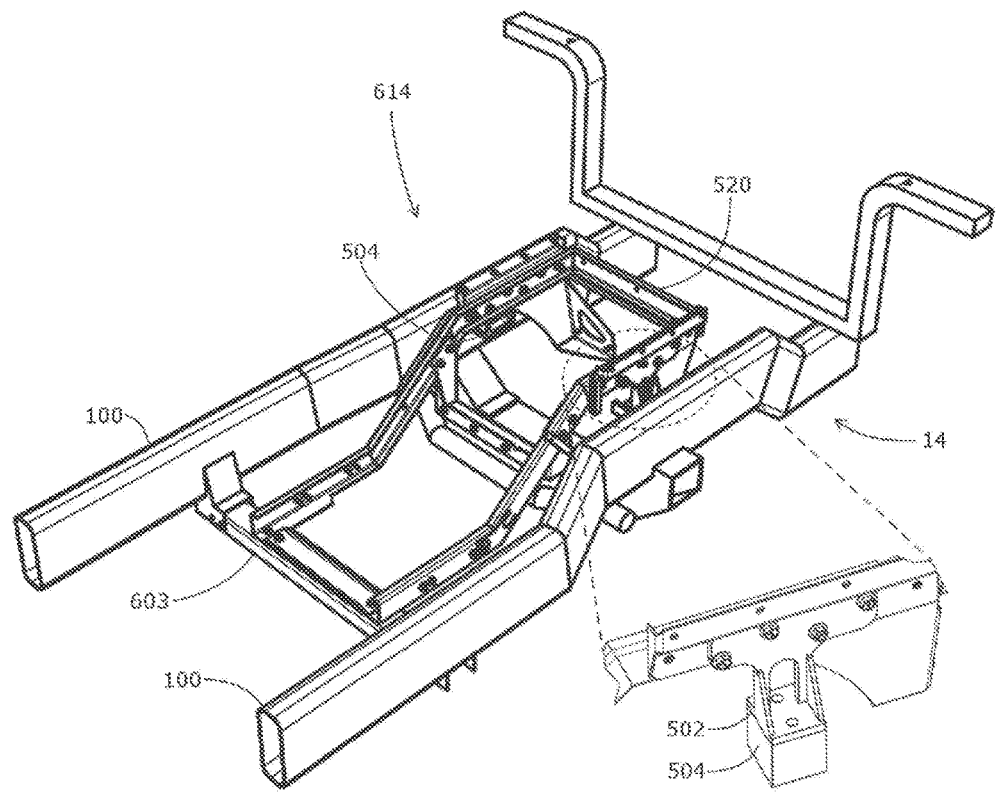
FIG. 6*a* presents an electric vehicle conversion kit having a frame to which can be mounted the electric motor and the replacement transmission of FIGS. 3 and 4, the frame being mounted to the chassis of FIG. 1, according to an alternate embodiment.
Figure 6B:
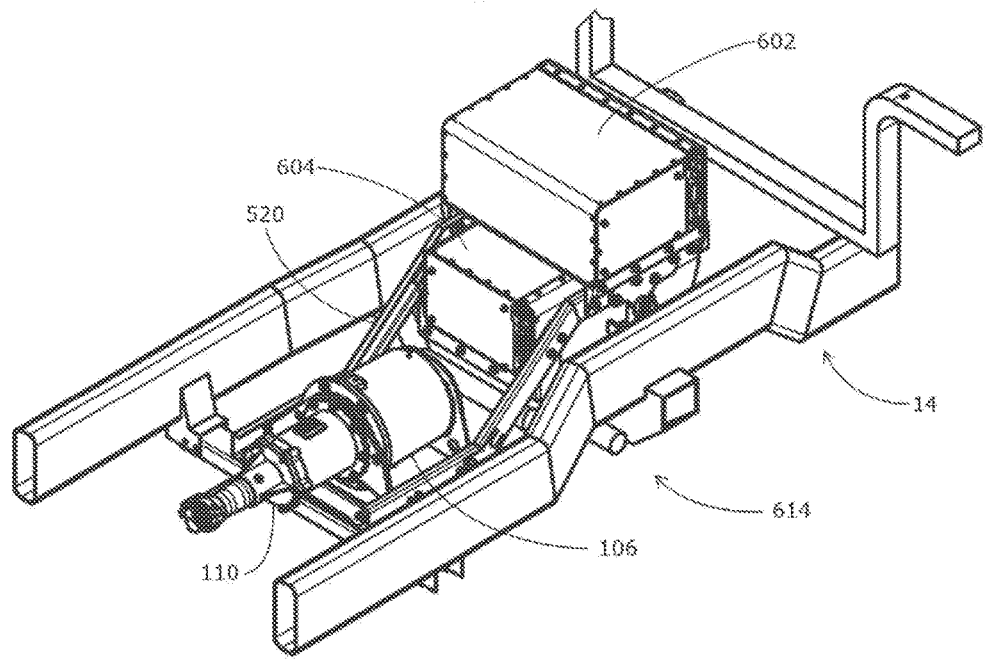
FIG. 6*b* presents an electric vehicle conversion kit mounted to the chassis of FIG. 1, the conversion kit having the frame of FIG. 6a to which is mounted the electric motor and the replacement transmission of FIGS. 3 and 4, according to one embodiment.

As presented in FIGS. 5b and 6a, the frame 520 is dimensioned to lie above the chassis 14 between the two beam-like supports 100 at a frontal section 614 of the chassis 14, such as to fit at least within the space that was originally defined to accommodate the combustion engine 104 and original transmission 108, when mounted with the electric motor 106 and adapted transmission 110. According to one embodiment, the frame 520 is attachable to the chassis with the cross member 103 and the original motor mounting supports 504, originally designed to support the original transmission 108 and the original motor 104 respectively.

A skilled person will recognize that in some embodiments, the transmission 110 is not required and the frame 520 is adapted to receive only the electric motor 106 and associated battery packs 602. For instance, it is known that direct drive electric motors do not require a transmission. The electric motor 106 of such a type can be specially designed to fit on the frame 520 or the frame 520 could be modified according to the design and dimensions of the electric motor 106.

Moreover, a skilled person will recognize that is some embodiments, the original transmission 108 can be reused and connected to the electric motor 106. In such embodiments, the frame 520 is adapted to receive the bulkier original transmission 108 or even a similar transmission to the original transmission 108 and if required, the plate 514 of FIG. 5a is adapted to support the original transmission 108.

Cross Member Attachment

According to one embodiment and as further presented in FIG. 5b, the rear portion 512 of the frame 520 is attached to the cross member 103 of the chassis 14 such as with C-clamps or U-bolts. The frame 520 is attached to the chassis 14 without having to modify the chassis 14 and even without having to drill holes within the chassis 14 structure. However, in some cases, bolts or screws can be used to further secure the frame 520 to the chassis 14. Moreover, in conformity with safety regulations, the frame 520 is attached to the cross member 103 with shear-bolts.

Depending on the vehicle type or make, the cross member 103 shape size or form can differ from one vehicle 10 to another. In order to facilitate and to expedite the conversion, some modifications to the chassis 14 may be required. For instance, according to one embodiment and as presented in FIG. 6a, the original cross member 103 is replaced with an adapted cross member 603 for attaching the rear portion 512 of the frame 520 thereto at predetermined attachment locations and with suitable predetermined attachments such as bolts, screws or shear-bolts. Customization of the attachments is thereby avoided when converting a different type or make of vehicle 10. Moreover according to one embodiment, the adapted cross member 603 is mounted on the chassis with nuts and bolts that reuse holes in the chassis that were initially used to support the original cross member 103, thereby limiting structural changes to the chassis.

According to another embodiment, an adapter plate (not shown) is used for interfacing between the frame 520 and the cross member 103. The adapter plate is attachable to the cross member 103 and the frame 520 is mountable on the adapter plate. For instance, the adapter plate is attachable to the cross member 103 with c-clamps or u-bolts, without modifying or piercing the cross member 103 and the frame 520 is attachable to the adapter plate using shear bolts. The shear bolts are used to secure the frame 520 to the cross member 103 via the adapter plate but are conceived to break off during a collision, in compliance with current safety standards and regulations. This way, the chassis 14 including the original cross member 103 remain unaltered and a same frame 520 design can be used irrespective of the vehicle type or make, only the adapter plate may require customization. In fact, for most common vehicle types and makes, the adapter plates can be manufactured in large numbers according to the specific original cross member 103 size, form and shape for the most common vehicle types and makes. During the conversion, a simple selection of an appropriate adapter plate according to the vehicle type and make would only be required.

A skilled person will understand that any other type of suitable attachment can be used to secure the rear portion 512 of the frame 520 to the cross member 103, while limiting modifications of the chassis 14, without departing from the present conversion kit 500.

Motor Mounting Attachment

According to one embodiment, in order to facilitate the conversion of the original vehicle 10 to an electric vehicle 10 without having to modify the existing chassis 14, there is provided a conversion kit 500 having a frame 520, as presented in FIG. 5a. The frame 520 is designed and dimensioned to be mounted on the existing chassis 14 while being adapted to receive, among others, the electric motor 106 and the adapted transmission 110. In one example, the frame 520 is secured to the chassis 14 with brackets 502 that are adapted to attach to the original motor mountings 504 of the chassis 14 without requiring modifications to the chassis 14, as concurrently presented in FIG. 5b.

A skilled person will understand that the design, size and configuration of the brackets 502 can differ from one kit 500 to another and that the brackets 502 are adapted to the size and configuration of the frame 520 and original motor mountings, in order to provide a secure attachment thereto.

Moreover, a skilled person will understand that an adapter plate can be used as an interface between the brackets 502 and the original motor mountings in order to avoid customizing the brackets 502 for specific motor mountings design, size and configuration, depending on the vehicle type or make.

Additional Cross Members

Figure 7A:
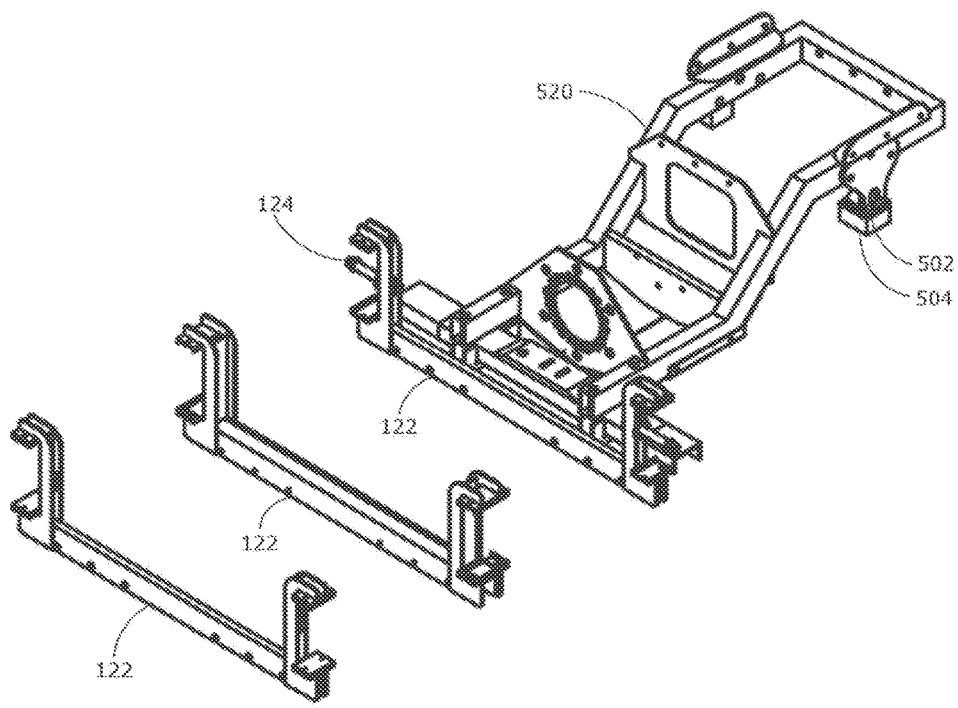
FIG. 7a presents the electric vehicle conversion kit of FIG. 5a having additional cross-members adapted to support batteries, according to one embodiment.
Figure 7B:
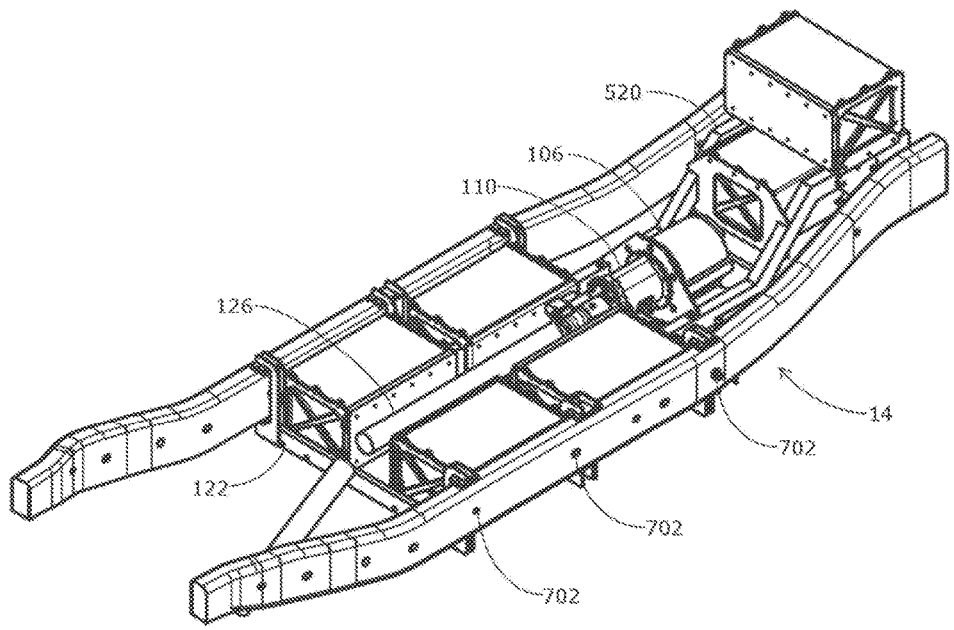
FIG. 7b presents the electric vehicle conversion kit of FIG. 7a mounted to the chassis of FIG. 1 and having mounted thereon a set of batteries, motor and transmission, according to one embodiment.

According to one embodiment and as presented in FIGS. 7a and 7b, the kit 500 further includes one or more additional cross members 122 which are designed to attach and fit between the main beam supports 100 at a central section of the chassis 14 using screws 702 or any other suitable attachment or combination of attachments. The additional cross members 122 are adapted to receive thereon one or more battery packs for powering the motor 106 while maintaining a passage for a rotation shaft 126 connected between the transmission 110 and the rear wheel differential (not shown).

Figure 7C:
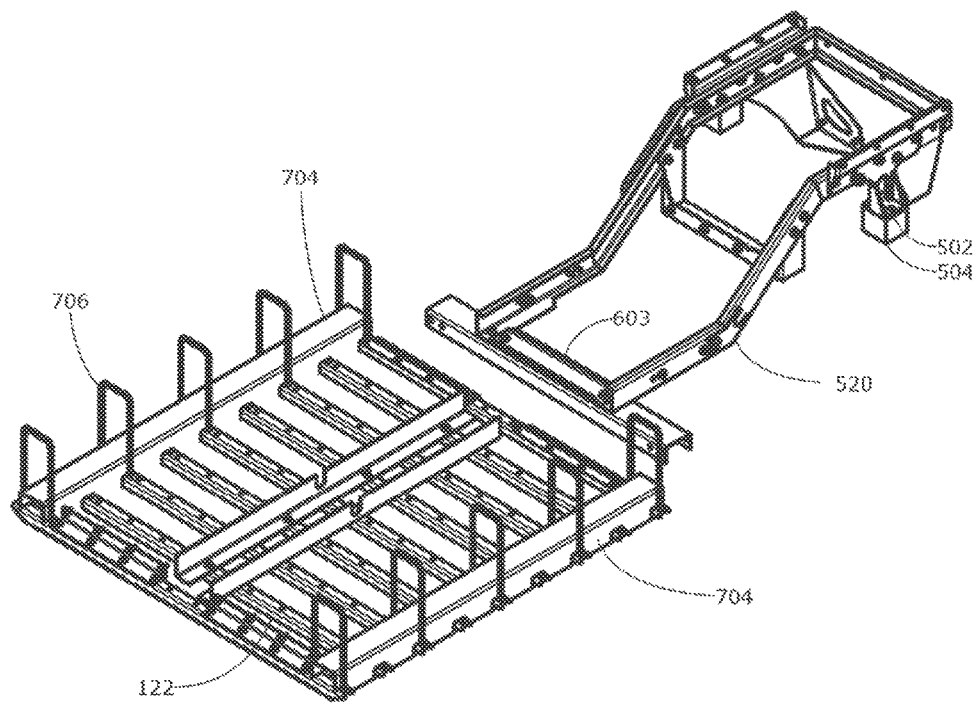
FIG. 7c presents the electric vehicle conversion kit of FIG. 6a having additional cross-members adapted to support batteries, according to an alternate embodiment.
Figure 7D:
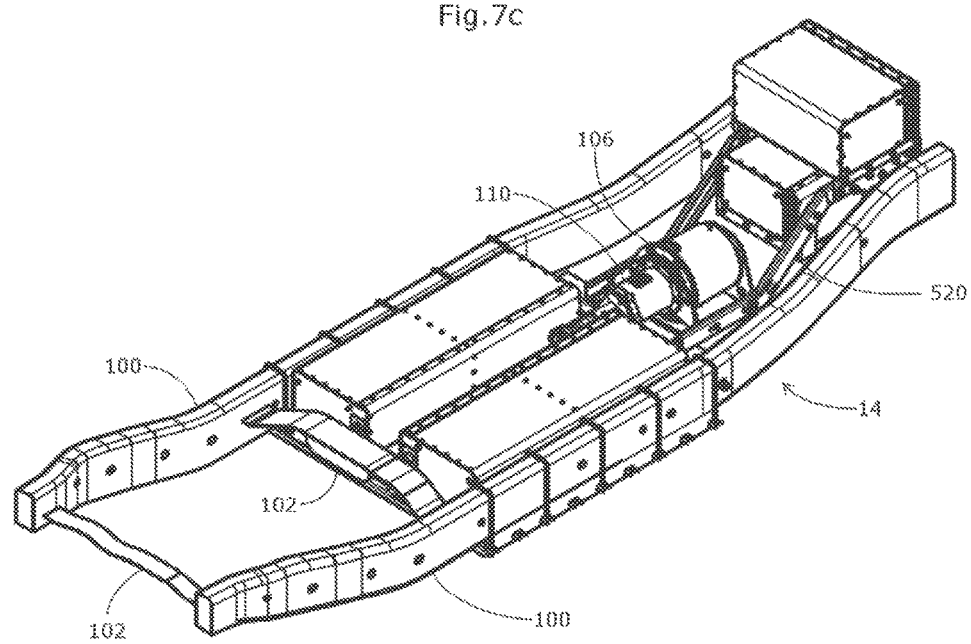
FIG. 7d presents the electric vehicle conversion kit of FIG. 7c mounted to the chassis of FIG. 1 and having mounted thereon a set of batteries, motor and transmission, according one embodiment.

According to another embodiment and as presented in FIGS. 7c and 7d, the kit 500 includes a plurality of additional cross members 122 which are designed to attach and fit between the main beam supports 100 at a central section of the chassis 14 using end supports 704 and u-bolts 706 for clamping onto the main beam supports 100, without piercing or modifying the main beam supports 100. These additional cross members 122 are adapted to receive thereon one or more battery packs for powering the motor 106 while maintaining a passage for a rotation shaft 126 connected between the transmission 110 and the rear wheel differential (not shown).

In a non-limiting example of configuration, the battery packs are provided on each side of the rotation shaft 126, as presented in FIGS. 7b and 7d. As shown in FIG. 7b, the battery packs are dimensioned and placed in order to securely fit between the two support members 100 as well as between the additional cross members 122. As shown in FIG. 7*d*, the battery packs are dimensioned and placed in order to securely fit between the support members 100 while extending over a plurality of cross members 122, on either side of the rotation shaft 126.

Method of Converting a Vehicle

Figures 8, 9:
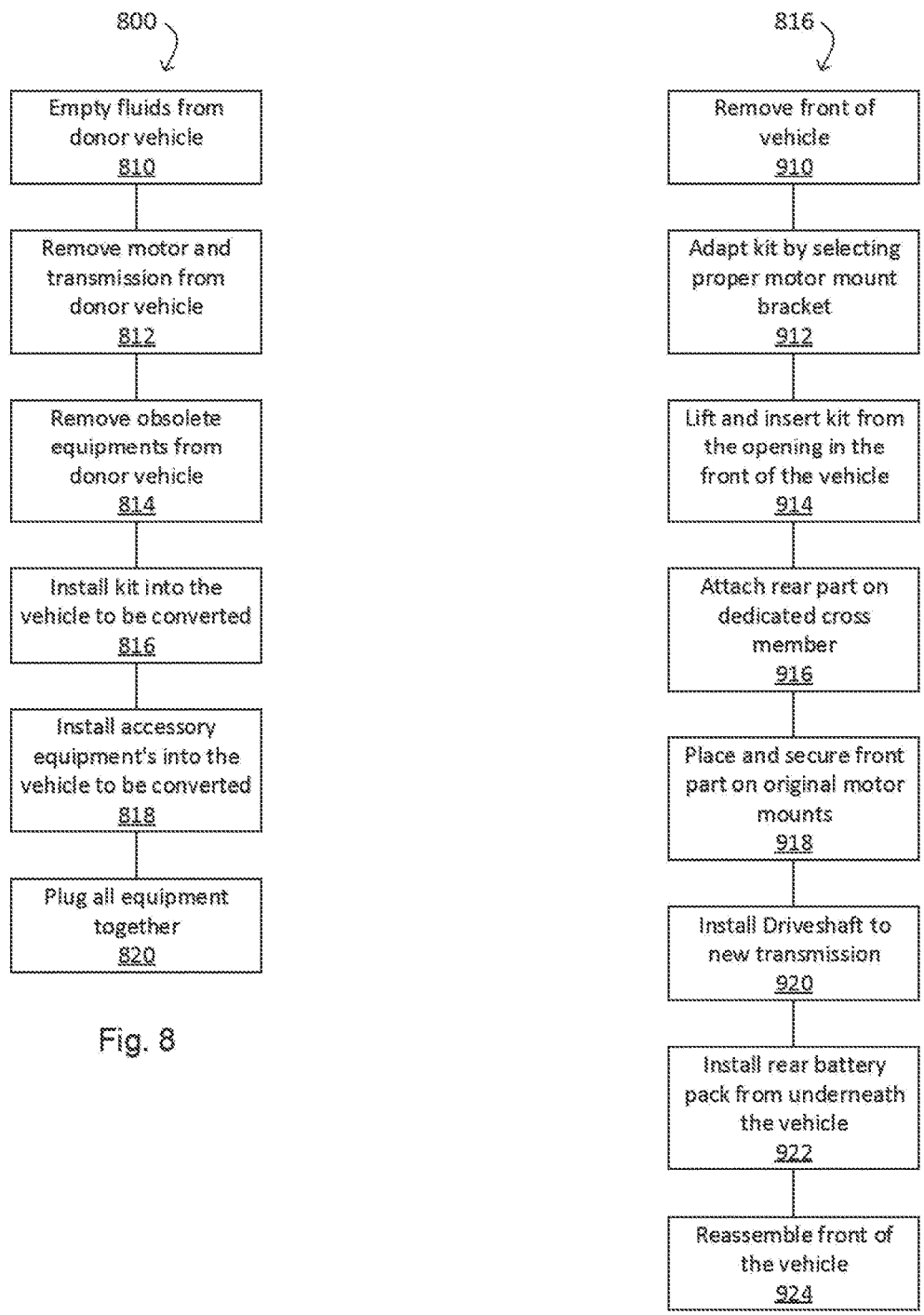
FIG. 8 presents a method of converting a vehicle to an electric vehicle, according to one embodiment.
FIG. 9 presents a method of installing a kit into a vehicle to be converted, according to one embodiment.

Presented in FIG. 8 is a method of converting a combustion engine vehicle to an electric vehicle using the electric conversion kit 800. In general, the method 800 consists of first removing combustion motor related parts from the donor vehicle (i.e. original combustion engine vehicle), then installing the conversion kit into the vehicle and then installing and connecting all accessory equipment.

In more detail, according to one embodiment, the removing combustion motor related parts from the vehicle consists of emptying the fluids of a donor vehicle 810, removing the combustion motor and transmission from the donor vehicle 812 and removing any other obsolete equipment from the donor vehicle 814, such as the fuel tank, muffler, alternator, vehicle management unit (VMU), etc.

FIGS. 8 and 9 present sequence diagrams of a method of installing the kit into the vehicle 816, according to one embodiment. The method 816 consists of first removing a front portion of the vehicle 910 such as removing the hood, bumper, radiator frame, headlamps and front cosmetics from the vehicle so as to provide a large enough opening in order to pass the kit therethrough. Removal of the front portion is optional, however it can facilitate installation of the kit frame. The method 816 further comprises selecting suitable motor mounting brackets 912 that are adapted to securely attach to the original motor mountings of the chassis 14. Then lifting and inserting the kit 914 from the previously provided opening in the front of the vehicle. Note that at this step, the kit 500 must have been assembled such that the electric motor 106, the front battery packs (602 or 604) and the transmission 110 are securely mounted on the frame 520, as presented in FIG. 11 (i.e. by mounting the electric motor on the frame 1112, mounting the transmission on the frame and connecting the transmission to the motor 1114, and mounting the front battery pack on the frame 1116).

Once positioned in the vehicle, the rear portion of the kit (i.e. rear portion 512) is attached 916 to the dedicated cross member and the front portion of the kit is secured 918 to the original motor mountings. Once the kit 500 securely attached to the chassis 14, the driveshaft is installed 920 and connected to the transmission. Note that the driveshaft is the original driveshaft that can be adjustably cut to size in order to fit with the kit 500, however in some cases it might be desirable to replace the original driveshaft with one that has a better fit. The original vehicle drivetrain including the rear differential and rear axle is normally reused, or it can be replaced if desired. In the case that the vehicle originally had a four wheel drive train, the transmission is connected into the four wheel drivetrain which can also include a transfer case. If desired, the additional cross members 122 are installed from underneath the vehicle 10 with the rear battery packs mounted thereon 922. Afterwards, the front of the vehicle is reassembled 924 by for instance, installing the hood, bumper, radiator frame, headlamps and front cosmetics. In some instances, the radiator frame is replaced by additional equipment related to the electric conversion kit such as an HVAC compressor, a cooling pump and a power steering pump. According to one embodiment, the electric system includes a TM4™ motor controller, the electric motor 106 and an auxiliary 12 Volt charger. The TM4 motor controller is an example of an electric vehicle motor controller that allows DC power from the battery to be converted into the desired electric motor voltage. It can also convert regenerative braking power from the electric motor and store such power in the battery.

Returning to FIG. 8, the method 800 further includes installing 818 accessory equipment into the vehicle such as installing an adapted HVAC system, a universal controller, etc. Then connecting 820 all the accessory equipment together. The accessory equipment can include new equipment such as accessory equipment associated with hosing, high voltage, low voltage and communications and also original components of the vehicle that were temporarily removed. Such components include for instance, the headlamps, the flashers, the horn, etc.

Accessory equipment associated with hosing can include the air-conditioning system, the cooling pipes of the main circuits, the steering system, the vacuum pump and the heating system. For the air-conditioning system according to one embodiment, a compressor and the original heat-exchanger (i.e. condenser) are mounted on the radiator mountings and are connected together and those units are reconnected to the original associated components of the vehicle such as an original control system and an original duct system (further presented as the environment control system 1208 of FIG. 13). For the cooling hoses of the main circuits (i.e. the motor controller), those are connected to a small radiator (not the original radiator) and an electric pump. The cooling hoses are attached to the electric motor 106, motor controller and auxiliary charger in order to cool them down during operation. For the steering system, the power steering pump (further presented as power steering pump 1314 in FIG. 13) can be mounted on the original radiator frame and connected to a dedicated electric motor. Adapted new hoses or hydraulic circuitry is further connected to the power steering pump 1314 and to an original steering power assist hydraulic motor unit 1212 for the original steering column, as concurrently presented in FIG. 13. The vacuum pump 1312 is mounted on the original vacuum booster of the original braking system power assist 1214, as concurrently presented in FIG. 13. For the heating system, a new heating unit mounted on the truck heats and pumps fluid that is connected to an original heating system of the vehicle 14.

Accessory equipment associated with high voltage can include connecting high voltage lines between the main battery system (602 and 604) battery packs mounted on additional cross members 122 as presented in FIGS. 6, 7*b* and 7*d*. Accessory equipment associated with high voltage can also include mounting the air conditioning compressor to an original radiator frame and connecting the air conditioning compressor to the main battery system (602 and 604) for powering the air conditioning compressor.

Accessory equipment associated with low voltage and communications include connecting the auxiliary 12 Volt battery to the universal controller (1202 of FIG. 12), communications system for the rear battery pack (battery packs mounted on additional cross members 122 of FIGS. 7*b* and 7*d*), steering pump, cooling pump, cooling fan, heating system, charging outlet communication, vehicle's communication interface, extra communication (CAN) bridge for a limited access communication interface and HVAC communication.

Moreover, other accessory equipment can also be connected such as the transmission arm wires related to the various drive positions: Park, Reverse, Neutral, Drive on the steering column within the cabin.

Method of Reusing the Kit

According to one embodiment, the conversion kit can be reused such as when the body of the vehicle 10 has come to the end of its life. Indeed as electric motors are adapted to function during an extended period of time, such as a total of twenty-thousand (20,000) hours or one-million (1M) kilometers, before having to be replaced. The electric conversion kit can function well beyond the life of the vehicle's body. Consequently, the electric conversion kit is configured to be reused from one vehicle to another. In order to reuse the electric conversion kit, it must first be removed from a first vehicle and be installed in a second vehicle that requires being converted.

FIG. 10 presents a method of removing a kit 1000 from a vehicle having a worn out body. The method 1000 can consist of removing a front of the vehicle 1010, such as removing the hood, bumper, radiator frame, headlamps and front cosmetics from the vehicle so as to provide a large enough opening to retrieve the kit from the vehicle. If required, the method 1000 further consists of removing rear battery packs and associated cross members from underneath the vehicle 1012. Then removing the driveshaft from the transmission 1014 and securing the kit to the anchor points of the lift 1016. Once the kit securely anchored to the lift, detaching the kit from the original motor mountings 1018 and detaching the kit from the center cross members 1020 for allowing a lifting out of the kit through the front opening 1022. If desired, the front of the vehicle can further be reassembled 1024.

The kit that has previous been removed from a worn out body vehicle such as according to the method 1000 can be reinstalled into a donor vehicle as presented in the method of converting a combustion engine vehicle to an electric vehicle using the electric conversion kit 800 of FIG. 8. This way, the kit can be reused in another vehicle, such as in a vehicle having a younger body or at least having a body that is less worn out.

Universal Controller

Figure 12:
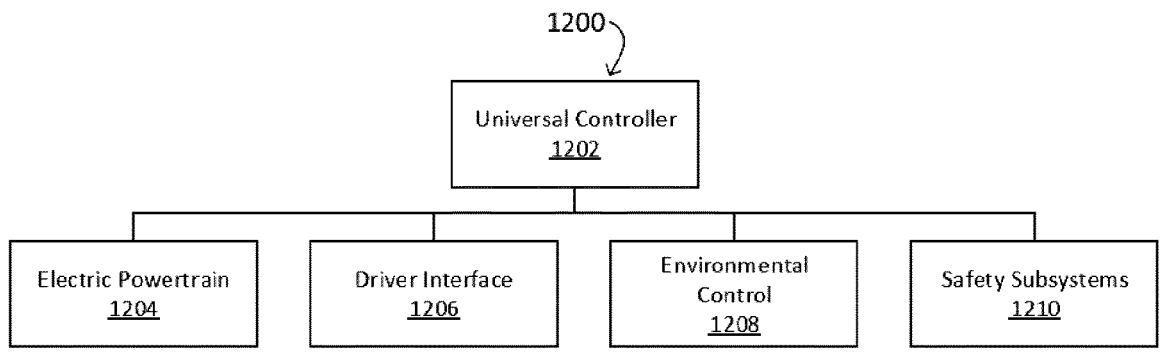
FIG. 12 presents a block diagram of a vehicle control system of a converted vehicle having a universal controller adapted to communicate with various control subsystems of the vehicle, according to one embodiment.

According to another aspect, when the vehicle gets converted to an electric vehicle, the original vehicle computer or Vehicle Management Unit (VMU) is unable to control the new electric powertrain components such as the electric motor and adapted transmission. Therefore the original vehicle computer must be replaced with a controller that is adapted to communicate and control the electric power train as well as other subsystems of the vehicle. Presented in FIG. 12 is a vehicle control system 1200 having a universal controller 1202 that is adapted to control the electric powertrain subsystem 1204 as well as the driver interface subsystem 1206, the environmental control subsystem 1208 and the safety subsystem 1210.

For better understanding, the electric powertrain subsystem 1204 includes at least the electric motor and transmission. The driver interface subsystem 1206 includes the pedals, the dashboard indicators, the antitheft device, or any other device that would allow the driver to interface with the vehicle and control the electric powertrain subsystem. The environmental control subsystem 1208 includes modules such as the heating module and the cooling module for controlling the cabin temperature, for instance. The safety subsystem 1210 includes various vehicle and driver safety modules such as the anti-lock braking system (ABS), the electronic stability control (ESC) system, the airbag system, etc.

Figure 13:
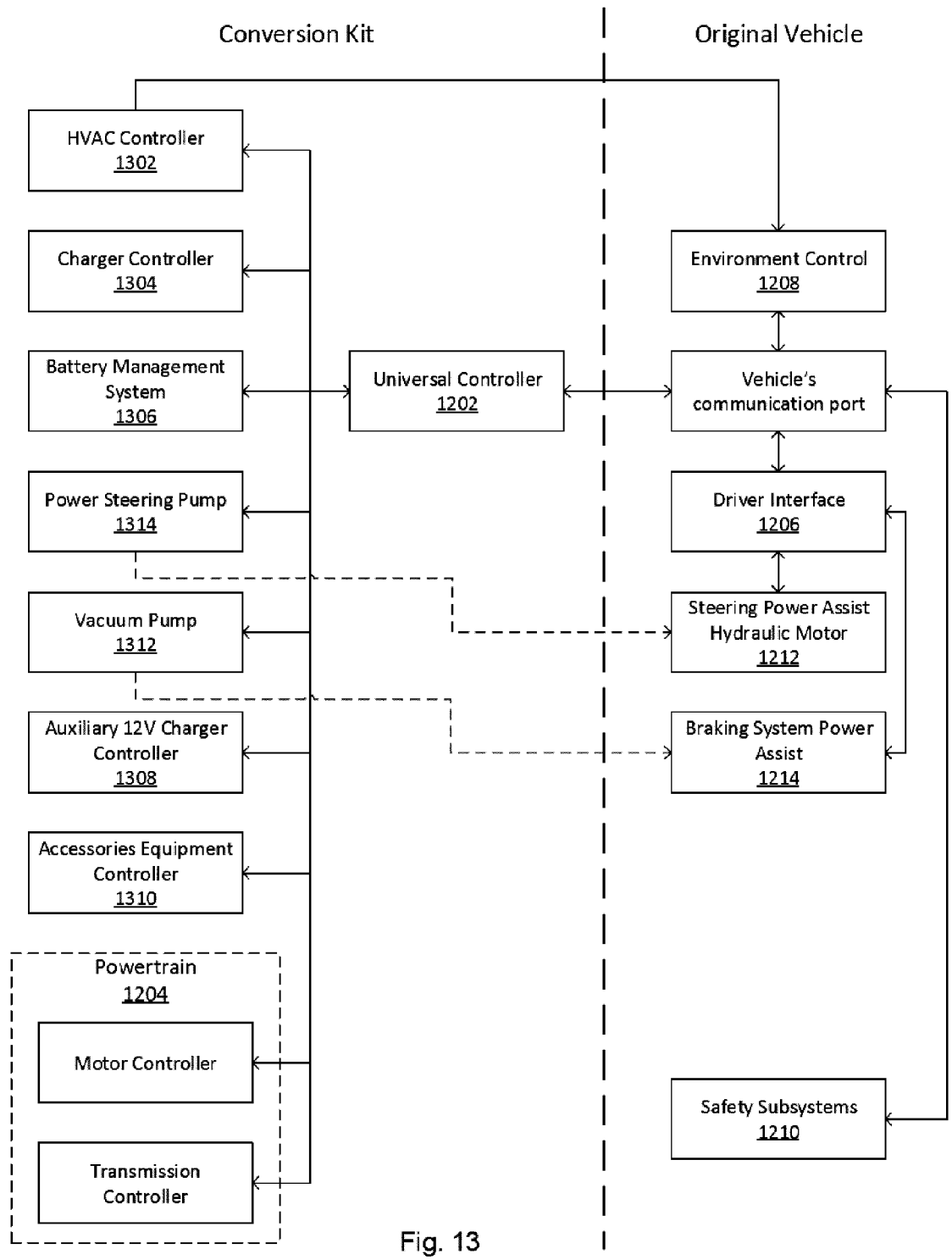
FIG. 13 presents a block diagram of the vehicle control system of FIG. 12 having the universal controller adapted to communicate with various control subsystems of the original vehicle as well as with additional subsystem modules of the conversion kit.

Moreover, as presented in FIG. 13 according to one embodiment, the universal controller 1202 is further adapted to control other systems of the vehicle such as an electric HVAC (Heating, Ventilation and Air Conditioning) controller 1302, a principal battery charger controller 1304, a Battery Management System (BMS) 1306 and an auxiliary battery charger controller 1308 or any other accessory equipment controller 1310 adapted for the electric vehicle such as, for instance, a power steering pump 1314 and a vacuum pump 1312.

According to one embodiment, the original HVAC system is replaced by the electric HVAC system 1302. As opposed to the original HVAC system, the electric HVAC system 1302 includes an air conditioning unit that runs with an electric compressor rather than a belt driven compressor powered by the combustion engine. In this embodiment as concurrently presented in FIG. 6, the electric compressor is powered by the main battery pack (602 or 604) and uses the original heat-exchanger and most of the original associated conduits in order to maximize original component reuse. Note that a dedicated battery adapted to provide enough power to the electric compressor is also possible. In this embodiment, the electric compressor is mounted on the original radiator frame, however, the electric compressor could as well be mounted at another location such as on the chassis and frame.

Also, as opposed to the original HVAC system, the electric HVAC system 1302 includes an autonomous heating unit rather than relying on the original combustion motor as a heat source. In fact, heat generated by the electric motor is negligible compared to the heat generated by the original combustion motor and the electric HVAC system cannot rely on the electric motor as a heat source. According to one embodiment, the autonomous heating unit is a small heating unit that is adapted to efficiently burn diesel fuel and is connectable to the original heating system (i.e. heating ducts and controls shown here as environment control 1208). In this case, the replacement heater can heat a coolant fluid, such as to effectively replace the original combustion motor as a heat source, and connects the heater to the original heating system. This solution could be appreciated by workers seeking to keep warm during waiting periods. In fact, in cold climates, fleet vehicles are kept running on idle for hours just to keep the cabin warm in order to allow the workers to heat themselves. An electric solution would drain the batteries, where a diesel solution uses very little fuel and is much more efficient that an idling vehicle.

The skilled person will however recognize that any other type of autonomous heating unit connectable to the original heating system can be installed in the converted vehicle such as an electric heater. The electric heater could advantageously permit pre-heating of the cabin while connected to a battery charging station.

According to another embodiment, the original belt driven alternator is replaced by an auxiliary battery adapted to be controlled by the auxiliary battery charger 1308 and adapted to provide a 12V DC current for operating various vehicle accessories such as the vehicle headlights, dashboard lights and cabin lights, the wipers, the heated rear windows, the power steering system or any other type of vehicle accessories requiring a 12V DC current. The auxiliary battery charger 1308 is powered by the principal battery pack, such as battery packs 602 and 604 of FIG. 6b.

According to yet another embodiment and as further presented in FIG. 13, some components of the original hydraulic power steering system are replaced. The original power steering pump is replaced by a new pump 1314 that is actuated by a dedicated electric motor. In the original vehicle, the power steering pump is powered by the combustion engine via a belt and pulley system. Moreover, the hydraulic circuit connected to the original power steering pump is also replaced by a new hydraulic circuit. The new hydraulic circuit is adapted to connect to the new pump 1314 and original steering power assist hydraulic motor unit 1212 for the original steering column (shown as driver interface 1206). In fact, the original steering column remains untouched and the associated safety features are maintained. In this embodiment, the new pump 1314 is mountable on the original radiator support of the vehicle 10, however the new pump 1314 can be mounted at another location, such on the chassis 14 or on the frame 520 itself. A skilled person will recognize that it is possible to modulate the power of the new pump 1314 according to an applied force on the steering system. Moreover, the skilled person will further recognize that the original hydraulic power steering system can be replaced by an electric power steering system, altogether.

According to yet another embodiment and as further presented in FIG. 13, some components of the original braking system are replaced. For instance, the intake of the original combustion engine creates a vacuum pressure that is used for increasing a force applied to the master cylinder of the braking system. The vacuum pressure is applied to a vacuum booster of the braking system power assist unit 1214 that is connected to the brake pedal (shown here as driver interface 1206). Since the original combustion engine 104 is replaced by the electric motor 106 and since the electric motor 106 does not create a vacuum pressure, a vacuum pump 1312 is added for creating the vacuum pressure required by the braking system power assist unit 1214. As can be noticed in FIG. 13, the braking system power assist unit 1214 of the original vehicle is maintained. The vacuum pump 1312 is mounted on the chassis 14 beside the vacuum booster of the braking system power assist unit 1214 in order to minimize hosing required to connect the two. However a skilled person will recognize that the vacuum pump 1312 can be mounted at another location on the chassis 14 or on the frame 520.

Each module of the subsystems (1204, 1206, 1208 and 1210) transmits various encoded data to the universal controller 1202 that are, in many cases, car manufacturer specific. However, the modules of the driver interface subsystem 1206 and the environmental control subsystem 1208 transmit simple data that can easily be decoded. The universal controller 1202 can be easily adapted to decode and properly process the data received from those subsystems (1206 and 1208), according to a car manufacturer. For instance, control of the transmission 110 can be done from the cabin of the truck using an adapted control system (not shown). According to one embodiment, the control system is adapted to provide a command to the electric motor 106 based on a detected movement of a conventional transmission arm located within the cabin. The transmission arm being a conventional transmission arm that is generally located near the steering wheel, or the central console, such that the driver can readily control, in order to change speed.

On the other hand, the modules of the safety subsystem 1210 transmit more complex data that is not as easily decoded. Moreover, data transmitted from the modules of the safety subsystem 1210 often refer to a predefined algorithm that is internal combustion engine specific.

According to one embodiment, the universal controller 1202 is adapted to receive an encoded event code from the safety subsystem 1210. However, rather than decoding the event code and processing the event code in order to apply a specific predefined algorithm as in the original vehicle, the universal controller 1202 systematically applies an algorithm that is based on an adaptable non-linear decreasing torque curve, irrespective of an information content of the encoded event code. For instance, the algorithm applies the following formula: Torque Reduction=$\Pi$ f($i_n$), where $i_n$ are information types such as: speed, time, torque, rpm, etc. The occurrence of an event is easily identifiable by the universal controller 1202 and the universal controller 1202 is adapted to process the occurrence of an event without having to decode the event type or information content stored in the event code and still maintain an acceptable safety level for the vehicle and the passengers.

Figure 14:
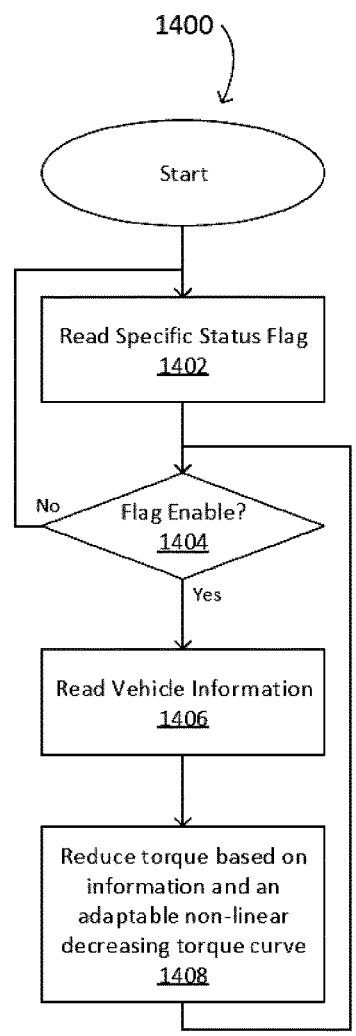
FIG. 14, appearing on the sheet of drawings with FIG. 12, presents a process flow diagram illustrating a method of controlling a powertrain of by the universal controller according to information from a safety subsystem of the vehicle control system of FIG. 12.

For instance, presented in FIG. 14 is a method of controlling an electric motor 1400, when the universal controller 1202 reads or receives 1402 from the safety subsystem, an event code indicative of an enabled status flag 1404, the universal controller 1202 sends instructions to the electric powertrain subsystem 1204 in order to reduce an output torque of the electric motor 1408, irrespective of the information content of the event code. As indicated in FIG. 14, the universal controller 1202 first reads a vehicle information 1406 and applies an algorithm to adaptively reduce the torque of the motor. Depending on the context, various vehicle information can be considered in order to adaptively reduce the torque of the motor, for instance, the vehicle information can include a vehicle speed, an applied torque of the motor or an RPM (Rotation Per Minute) of the motor, etc.

According to one embodiment, when the universal controller 1202 receives an event code from the ESC (Electronic Stability Control) module of the safety subsystem, the universal controller 1202 verifies if the event code indicates an enabled flag and also verifies a duration of the enabled flag (i.e. time duration since the flag has been enabled). If the event code indicates an enabled flag, the universal controller 1202 generates instructions to the electric powertrain subsystem 1204, according to the duration time of the enabled flag, the vehicle information and an algorithm in order to adaptively reduce the torque of the motor.

While preferred embodiments have been described above and illustrated in the accompanying drawings, it will be evident to those skilled in the art that modifications may be made without departing from this disclosure. Such modifications are considered as possible variants comprised in the scope of the disclosure.

For instance, connected to the battery packs 602 and 604 is a charger (not shown) that is placed right above the battery pack 602. A skilled person will understand that the charger could be placed at another location on the frame or elsewhere in the vehicle, without departing from the scope of the present invention. Moreover, the charger could further replace the battery pack 602 and be mounted right on the frame 520.

Also, a motor controller (not shown) adapted to control the electric motor 106 can be placed in various locations of the vehicle, in one embodiment, the motor controller is placed right in front of the frame 520. Moreover, the auxiliary 12 Volt battery charger 1308 can also be mounted in front of the frame 520, for instance.

The invention claimed is:

1. A kit for converting an internal combustion vehicle into an electric vehicle, the combustion vehicle having a chassis originally adapted to support an original engine at a head section of said chassis and originally adapted to support an original transmission connected to said original engine at a middle section of said chassis, the chassis further adapted to support a fuel tank and an exhaust system at a tail section, the kit comprising:

a frame adapted to be mounted on the chassis with vehicle model specific attachment devices at the head section of the chassis and at the middle section of the chassis;

an electric motor and an electric motor mounting for attaching the electric motor to said frame;

a replacement transmission adapted to the electric motor and a transmission mounting for attaching the transmission to said frame and connectable to the electric motor; and at least one battery system adapted to feed the electric motor and attachable to the frame;

wherein the kit further comprises a universal controller adapted to connect to an original vehicle control system communication port and adapted to control the electric motor according to an encoded event flag activated by a safety subsystem module of said original vehicle control system without decoding the encoded event, the safety subsystem module being connected to the original communication port.

2. The kit as claimed in claim 1, wherein said frame has a frontal portion that is attachable to the chassis in alignment with the head section.

3. The kit at claimed in claim 2 wherein the frontal portion is attachable to the chassis at an original engine mounting at the head section.

4. The kit of claim 2, further comprising an adapted interface plate for securely attaching the frontal portion to the chassis or for securely attaching the rear portion to the chassis.

5. The kit as claimed in claim 1, wherein said frame has a rear portion that is attachable to the chassis in alignment with the middle section.

6. The kit as claimed in claim 5, wherein the rear portion is attachable to a cross member of the chassis at the middle section.

7. The kit as claimed in claim 6, wherein the frontal portion has a first battery attachment platform positioned at an upper side of the frontal portion and a second battery attachment platform positioned at a lower side of the frontal portion.

8. The kit as claimed in claim 1, wherein said frame has a frontal portion and a rear portion, the frontal portion being operatively elevated with respect to the rear portion.

9. The kit as claimed in claim 1 further comprising additional cross sections adapted to support additional battery packs connectable to the electric motor, the additional cross sections being attachable to the chassis at the tail section.

10. The kit as claimed in claim 1, wherein the universal controller is adapted to control the electric motor according to an adaptable non-linear decreasing torque curve when the encoded event flag is activated, and to restore normal torque when the encoded event flag is no longer activated.

11. The kit as claimed in claim 1 wherein the safety subsystem module is an ESC module or an ABS module.

12. The kit as claimed in claim 1, wherein said chassis is an H-frame chassis of a pick-up truck type vehicle having a raised head section and a lower middle section.

13. The kit as claimed in claim 1, wherein said attachment devices at the head section are configured to connect to engine mounting block supports of said chassis.

14. The kit as claimed in claim 1, wherein at least one of said frame and said attachment devices allow for said chassis to crumple during a front impact without offering any additional resistance.

15. The kit as claimed in claim 14, wherein said attachment devices at the middle section comprise shear bolts for detaching from said chassis during a front impact that causes said chassis to crumple, said frame remaining supported by said attachment devices at the head section following a front impact.

16. A pick-up truck type vehicle comprising the kit as claimed in claim 1.

* * * * *